(12) United States Patent
Ferencz et al.

(10) Patent No.: US 7,666,338 B2
(45) Date of Patent: Feb. 23, 2010

(54) FOCUSED HEAT EXTRUSION PROCESS FOR MANUFACTURING POWDER COATING COMPOSITIONS

(75) Inventors: Joseph M. Ferencz, Litchfield, OH (US); Vincent A. Gaspar, Columbia Station, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1312 days.

(21) Appl. No.: 10/809,595

(22) Filed: Mar. 25, 2004

(65) Prior Publication Data

US 2005/0212171 A1    Sep. 29, 2005

(51) Int. Cl.
*B29C 47/38* (2006.01)
*B29C 47/78* (2006.01)
*B29C 47/92* (2006.01)

(52) U.S. Cl. ............... 264/211.21; 264/40.6; 264/211; 264/211.23; 264/211.24

(58) Field of Classification Search ............. 264/211.23
See application file for complete search history.

(56) References Cited

U.S. PATENT DOCUMENTS

| | | | |
|---|---|---|---|
| 4,007,154 A | 2/1977 | Schimmel et al. | 260/37 |
| 4,041,115 A * | 8/1977 | Jenkins et al. | 264/5 |
| 4,302,562 A | 11/1981 | Becher et al. | 525/327 |
| 4,973,439 A | 11/1990 | Chang et al. | 264/101 |
| 5,169,582 A | 12/1992 | Illing | 264/141 |
| 5,308,648 A | 5/1994 | Prince et al. | 427/212 |
| 5,468,586 A | 11/1995 | Proper et al. | 430/137 |
| 5,605,720 A | 2/1997 | Allen et al. | 427/288 |
| 5,659,348 A | 8/1997 | Malhotra | 347/105 |
| 5,750,909 A | 5/1998 | Hawkins et al. | 73/866 |
| 5,814,673 A | 9/1998 | Khait | 521/40 |
| 5,844,071 A * | 12/1998 | Williams et al. | 530/210 |
| 5,885,678 A | 3/1999 | Malhotra | 428/41.8 |
| 5,919,530 A | 7/1999 | Hurley et al. | 427/557 |
| 6,180,685 B1 | 1/2001 | Khait | 521/40 |
| 6,365,648 B1 | 4/2002 | Couperus et al. | 523/340 |
| 6,479,003 B1 * | 11/2002 | Furgiuele et al. | 264/176.1 |
| 6,583,187 B1 | 6/2003 | Daly et al. | 521/56 |
| 6,677,386 B1 * | 1/2004 | Giezen et al. | 516/31 |
| 6,703,005 B2 * | 3/2004 | Allan et al. | 424/65 |

(Continued)

FOREIGN PATENT DOCUMENTS

EP    0 596 835    5/1994

(Continued)

OTHER PUBLICATIONS

Allan L. Griff, Plastics Extrusion Technology, copyright 1962, Reinhold Publishing, Second Edition, pp. 318-319.*

(Continued)

*Primary Examiner*—Jeffrey Wollschlager
(74) *Attorney, Agent, or Firm*—Diane R. Meyers

(57) ABSTRACT

An extrusion process for manufacturing powder coating compositions is disclosed. The process generally includes a shear mixing step done at ambient temperature and a focused heating step in which the shear mix is heated to a higher temperature for a shorter time than in conventional methods. The focused heating provides for a shorter heat history, resulting in enhanced coating properties. The mixture may be cooled before it leaves the extruder.

14 Claims, 1 Drawing Sheet

U.S. PATENT DOCUMENTS

| | | | |
|---|---|---|---|
| 6,846,893 B1 * | 1/2005 | Sherman et al. | 528/28 |
| 2006/0079650 A1 * | 4/2006 | Stevenson et al. | 525/440 |

FOREIGN PATENT DOCUMENTS

| | | |
|---|---|---|
| EP | 1 041 124 | 10/2000 |
| EP | 1228850 | 8/2002 |
| EP | 1240993 | 2/2005 |
| JP | 02175769 | 7/1990 |
| WO | WO 95/31507 | 11/1995 |
| WO | WO98/17726 * | 4/1998 |
| WO | WO 00/63305 | 10/2000 |
| WO | WO00/69916 * | 11/2000 |
| WO | WO 02/22747 | 3/2002 |

OTHER PUBLICATIONS

Patent Abstracts of Japan, Publ. No. 60258270, dated Dec. 1985 entitled "Powder Coating Composition for Rugged Pattern Finishing", Nippon Oil & Fats Co. Ltd.

* cited by examiner

FOCUSED HEAT EXTRUSION PROCESS FOR MANUFACTURING POWDER COATING COMPOSITIONS

FIELD OF THE INVENTION

The present invention relates to the field of manufacturing powder coating compositions, and in particular to an extrusion process for forming thermosetting powder coating compositions.

BACKGROUND OF THE INVENTION

Powder coating compositions are well known in the industry and have been prepared by various methods. The use of powder coatings has grown dramatically primarily due to their environmental advantages over liquid coatings, e.g. solvent based coatings. Specifically, powder coatings do not contain volatile organic solvents that evaporate during application or curing; omitting solvent results in considerable environmental and costs savings. For example, conditioned air from powder paint booths may be recycled rather than exhausted because it does not contain solvent vapor. Further, powder coating overspray is easily captured and recycled without the use of a water-wash system, eliminating environmentally difficult paint sludge from booth wash water.

Thermosetting coating powders are typically made by first blending or "dry-mixing" the starting materials in a batch mixer, also called a pre-hopper. This "premix" is then melt compounded or melt mixed in an extruder, such as a single- or twin-screw extruder. In the extruder, the starting materials melt and are further blended together to form a homogeneous mixture, also called a "melt mix". A typical extruder will have heat applied to the extruder along the entire length thereof (except perhaps at the intake spot) to maintain an elevated temperature of the materials during melt mixing. The temperature is selected above the melt temperature of the resin but below the temperature that would cause significant crosslinking to occur. The temperature is determined on a product-by-product basis and will depend upon the specific constituents of a given powder coating as well as the specifics of the extruder (e.g. screw pitch, bore diameter, etc.). It is desired that minimal reaction occur between the resin and curing agent(s) in the extruder. As the melt mix exits the extruder as "extrudate", it is cooled rapidly on a cooled drum and then passed to a cooled belt. The cooled compound is broken into granules. The friable granules are then ground in a hammer mill, or the like, to a fine particle size that may be further processed, such as by being screened in a classifier, before packaging.

The dry mixing and melt mixing of a typical powder coating manufacturing process may be insufficient to disperse the pigment uniformly throughout the powder coating or may otherwise result in a less homogeneous powder coating than desired. The insufficient mixing may result in non-uniform flow of the powder during application of the coating, and may further result in poor gloss and distinctness-of-image in the final coating. Increasing the time in the extruder to provide more mixing could improve homogeneity, but also may increase the amount or degree of internal crosslinking of the extrudate. Therefore, there remains a need for methods of producing pigmented and/or non-pigmented powder coating compositions that disperse pigment and/or other dry constituents uniformly throughout the composition without detrimentally affecting the extrudate.

SUMMARY OF THE INVENTION

The present invention provides an extrusion process for manufacturing powder coating compositions that achieves adequate dispersion of ingredients within the extrudate while minimizing internal crosslinking within the extrudate. This is done by reducing the overall heat history of the powder coating during processing. "Heat history" refers to the amount and duration of heat to which the extrudate is exposed during processing. By reducing the heat history, while still achieving adequate, if not improved, dispersion, the present methods offer an advantage over currently-practiced techniques. The heat history of the extrudate is reduced by mixing the starting materials at ambient temperature, melt mixing the mixture resulting from the ambient mix, and, optionally, cooling the melt mix before it exits the extruder.

DETAILED DESCRIPTION OF THE INVENTION

Figure 1:
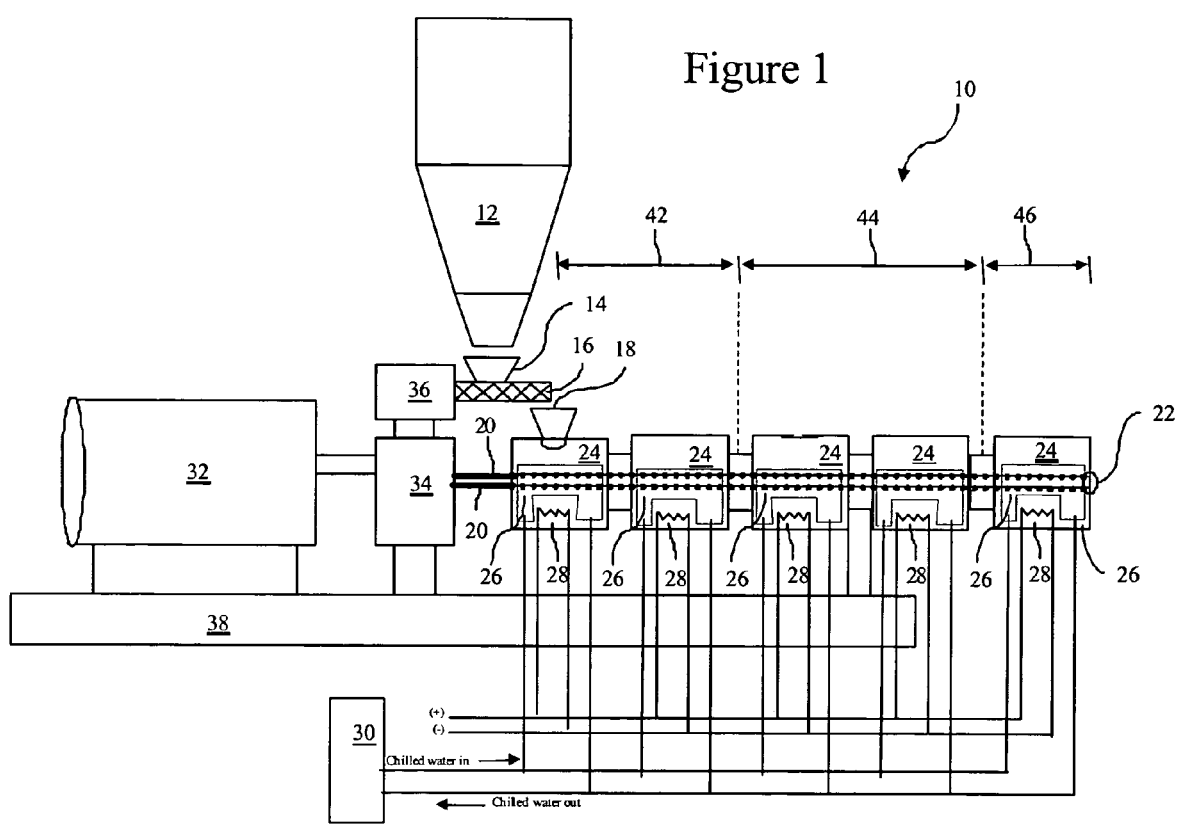
FIG. 1 is a schematic view of an extruder for use in one embodiment of the present invention.

The present invention is directed to a process for manufacturing powder coating compositions comprising feeding starting materials used in formulating the powder coating compositions to an extruder, such as from a pre-mix hopper. The starting material may, or may not, be dry mixed prior to being fed to the extruder. The starting materials may be fed directly to the extruder from several locations or can be fed directly to the extruder through a main inlet. "Starting material(s) of a powder coating", "starting material(s)", and like terms refer to the components of the powder coating, including but not limited to one or more of resins, crosslinking agents, pigments, catalysts, flow control additives, fillers, and/or UV stabilizers and the like. The starting materials undergo shear mixing in a first portion of the extruder at ambient temperature. The term "shear mixing" refers to mixing components in the extruder at ambient temperature, which will be understood as being below the lowest melt temperature of the majority of the components of the starting material. "Ambient temperature" is generally 18° C. to 30° C., +/−5° C. It will be appreciated that the mechanical mixing that takes place in the shear mixing step may increase the temperature of the mixture and so cooling may be necessary to maintain the mixture at ambient temperature. The shear mixed materials are then passed to the next portion of the extruder, the second portion, where they are heated in a melt mixing process to form a melt mix. "Melt mixing" refers to the process of mixing at a temperature above the melt temperature of the resin(s) but below the temperature at which significant crosslinking of the components will occur; the resulting product is a "melt mix". Typically, the second portion heats the materials to a temperature of about 70° C. to 150° C. The process may further include passing the melt mix to a third portion of the extruder where the melt mix is cooled. This "cooled portion" of the extruder cools the mix as it passes through this segment; the temperature of the extrudate exiting the outlet at the end of the cooled portion may be reduced by about 10° C. to 35° C. This "pre-cooling" step that occurs before the mixture comes in contact with the chilled rollers results in increased viscosity of the mixture; increased viscosity in turn results in increased or better mixing.

An extruder body generally consists of a plurality of adjacent barrels and one or more (typically two) screws. The barrels may divide the extruder into portions, also called zones, identifying what is occurring to the mixture therein, such as feed, transition, mixing, dispersion, and metering portions or zones. The screws convey and mix the ingredients of the melt mix through the externally heated/cooled barrels during processing and then meter the melt mix through a die at the main outlet and onto the cooling drum.

The extruder according to the present invention includes a first ambient portion, a second heated portion (also called a melt mixing portion), and a third cooled portion. In the ambient portion heat may be removed as needed, in the heated portion heat is added, and in the cooled portion heat is removed. An extruder "portion" is a length of the extruder between the main inlet and the main outlet. An extruder portion may be formed of a fraction of one extruder segment or barrel, or a combination of one or more segments or barrels of an extruder, including the entire lengths thereof. In one embodiment, the first ambient portion of the extruder forms about 25 percent to about 40 percent of the length of the extruder and extends from the main inlet to the heated second, portion; the second, heated portion of the extruder forms about 25 percent to about 40 percent of the length of the extruder and extends from the first, ambient portion to the third, cooled portion; and the third, cooled portion of the extruder forms about 25 percent to about 40 percent of the length of the extruder, and extends from the second, heated portion to the outlet. These percents can be varied to suit the needs of the user.

FIG. 1 is a schematic view of an extruder 10 for use in an extrusion process for manufacturing thermosetting powder coating compositions according to an embodiment of the present invention. The extruder 10 includes a premix hopper 12 for holding and introducing the starting materials. The premix hopper 12 feeds the starting materials through an exit or funnel 14 that leads to a mechanical feeder 16, such as a feed screw. The feeder 16 leads to a main inlet 18 of the extruder 10. The extruder 10 further includes a pair of feed screws 20 extending along the length of the extruder 10 from the main inlet 18 to a main outlet 22 of the extruder 10. The "length of the extruder" 10 refers herein to the active length of the extruder 10 and is measured from the main inlet 18 to the main outlet 22 along the axis of the feed screws 20.

Surrounding the feed screws 20 are a plurality of adjacent barrels or segments 24. These segments reflect the extruder "portions" as described herein. FIG. 1 illustrates five (5) such segments, however any number of segments 24 may be provided as desired. Further, the individual segments 24 may be constructed of varying lengths. The five segments 24 shown in FIG. 1 are intended to merely illustrate the general structure of the extruder 10 used in one embodiment of the present invention and not be restrictive thereof. Each segment 24 includes an independent fluid jacket 26 adjacent an internal mixing chamber and a heating coil 28 adjacent the internal mixing chamber. The fluid jacket 26 is generally utilized for cooling the material in the mixing chamber through the use of a cooling fluid (e.g. water). The fluid jackets 26 and the heating coils 28 of each segment 24 are independently controlled through a central controller 30. Further, the extruder 10 includes a main motor 32 driving the feed screws 20 through a gear box 34 and a motor 36 driving the mechanical feeder 16, with the components mounted on a base 38 as generally known in the art.

With independent control of the heating and cooling of each segment 24 by the central controller 30, the segments 24 form separate independently temperature controlled portions, or zones, along the length of the extruder 10. Each segment 24 is constructed to and capable of being controlled to be an ambient portion in which ambient temperatures are maintained, a heated portion in which heating coils 28 are activated to add heat to the material, or a cooled portion in which cooling fluid in the fluid jacket 26 removes heat from the material. There can be as many distinct zones in a given extruder as there are segments 24. The process according to one embodiment of the present invention forms three portions along the extruder 10—an initial ambient portion, an intermediate heated portion and a final cooled portion.

With an understanding of the extruder 10, an extrusion process for the manufacturing of thermosetting powder coating compositions according to one embodiment of the present invention can be further discussed. The starting materials used in formulating the powder coating compositions are fed to the extruder 10 through the main inlet 18, such as from the pre-mix hopper 12. The starting materials then undergo shear mixing in a first ambient portion of the extruder 10. Typically, the shear mix according to the present invention will be maintained, with cooling if necessary, at a temperature of 18° C. to 30° C., +/−5° C.; in one embodiment, the shear mix step takes about 1 to 30 seconds. Conventional processes do not include a shear mix step at ambient temperature, but rather the components begin melting right away. By delaying melting until the second portion of the extruder, according to the present invention, a more thorough grinding and mixing is achieved. The ambient portion may extend for 25 percent to 40 percent of the length of the extruder, and may include one or more of segments 24.

Following the shear mixing step in the first, ambient portion is a melt mixing step in which the shear mix is heated so as to melt mix the ingredients in the second, heated portion of the extruder 10. In this melt mixing step, the shear mix is heated to a temperature about 25 percent higher than the temperature to which the constituents would have been heated to in a conventional extrusion process that continuously heats the ingredients throughout the length of the extruder 10. Typically, the mix according to the present invention will be heated to a temperature of 70° C. to 150° C.; this step also takes about 1 to 30 seconds. In a conventional process, in contrast, melting occurs during the entire extrusion process. Compared with conventional methods, the present invention may employ higher temperatures, but for a shorter time; this is referred to herein as "focused heating". The length of the second, heated portion of the extruder 10 may be 25 to 40 percent of the length of the extruder 10 and again may comprise one or more of segments 24.

Following the "focused heating" or melt mixing step is a cooling step in which the segment(s) 24 that extend from the end of the second, heated portion of the extruder 10 to the outlet 22 are cooled through fluid jackets 26 to reduce the temperature of the melt mix passing therethrough. As noted above, the temperature of the extrudate exiting the outlet 22 may be reduced by about 10° C. to 35° C., although again the temperature reduction can be determined by the user.

The extrusion process for manufacturing thermosetting powder coating compositions described above according to the present invention maintains adequate dispersion of ingredients within the extrudate and minimizes internal crosslinking within the extrudate. The total heat history of the extrudate is lower than in a conventional process that applies heat across the length of the extruder. The process of the invention does not require specialized equipment and can use a conventional extruder. It is possible that a shorter extruder (e.g. less segments 24) may be utilized with the process according to the present invention to achieve the desired mixing in the extrudate than would be used in the conventional process to achieve the same level of mixing. Another advantage of the process of the present invention is increased dispersion and mixing of starting materials having distinct melting temperatures. The configuration of the extruder 10 used in the process according to the present invention can be modified such as by changing the shaft design, which can change the position or length of the ambient, heated and cooled portions, as well as the overall length of the extruder 10. Further, the specific temperature profile used for a given coating powder can be determined based upon the specific starting materials in a given run by using the Glass Transition onset method, which will be familiar to those skilled in the art. The "temperature profile" refers to the temperature gradient across the length of the extruder (i.e. the desired temperature during the ambient portion, the desired heating of the material in the heated portion, and the desired cooling in the cooled portion).

EXAMPLES

The following examples are intended to illustrate the invention, and should not be construed as limiting the invention in any way. "Parts" refers to parts by weight.

Measuring the characteristics of pigmented and non-pigmented powdered coatings can be done, for example, in three different ways. The first and arguably most important is crater sensitivity. If the coating is of poor quality, cratering will be obvious immediately. This test is performed by applying the powder coating to a substrate, baking the coating and visually observing whether craters are present. The second measurement is through a surface scan on a cured film measuring Long Wave ("LW") and Short Wave ("SW") appearances. These values determine the smoothness of the coating. This test is performed typically by a BYK Wavescan, DOI, or AutoSpec type meters. An acceptable range for Long Wave appearance is typically 0-3 and an acceptable range for Short Wave appearance is typically 0-15. The test results presented below were obtained using a BYK Wavescan Model #259 015907 E0008 according to the manufacturer's instructions. Both LW and SW measurements were made, as were du, Wa and We values. The third measurement is a wedge panel test, performed by spraying and curing a film of the subject powder coating ranging from 0.5 mils to 1.5 mils in thickness. A visual observation is made. In the lower film range, particulates or seeds are counted on the film. These seeds are evident as their size is generally larger than the cured film and are identified as a circular bump or "seed". An acceptable range is typically 5 seeds or less at 1.5 mils. Other mar and scratch, gloss and brightness of image ("BOI") testing can also be done.

Laboratory trials were conducted comparing a coating powder formed from a traditional extrusion process and a coating powder formed by process according to the present invention. The same starting materials and amounts were used in preparing the two coatings. The target rate at which the coating was processed are shown in Table 1 for both the samples processed by the conventional method and the samples processed with focused heating. The temperature (° C.) for the nine extruder zones through which the starting materials passed is as follows:

| Zone | Conventional | Focused Heating |
| --- | --- | --- |
| 1 | 110 | 25 |
| 2 | 110 | 25 |
| 3 | 125 | 25 |
| 4 | 125 | 135 |
| 5 | 125 | 140 |
| 6 | 125 | 135 |
| 7 | 120 | 50 |
| 8 | 110 | 30 |
| 9 | 110 | 30 |

The two powder coatings were electrostatically applied (approximately 3 grams of dry powder film) to 4"×12" black electrocoated panels. The panels were cured at an appropriate elevated temperature and cooled to ambient temperature. The number of craters, if any, were visually noted. Results of the testing are shown in Table 1.

TABLE 1

| Sample | Target Rate #'s/min | Avg Dry Film Thickness | LW | SW | du | Wa | We | BOI | 20° Gloss | Craters (Total) |
| --- | --- | --- | --- | --- | --- | --- | --- | --- | --- | --- |
| Conventional | | | | | | | | | | |
| 1 | 1.03 | 2.4 | 1.9 | 11.8 | 6.3 | 15.5 | 8.7 | 89.9 | 84.3 | 2 |
| 2 | 1.03 | 2.7 | 2 | 10.6 | 3.3 | 10.7 | 3.3 | 93.2 | 84.3 | 0 |
| 3 | 1.03 | 2.4 | 1.6 | 8.1 | 3.6 | 11.1 | 5.7 | 93.2 | 84.4 | 0 |
| AVE | | | 1.7 | 10.3 | 4.4 | 12.433 | 5.9 | 92.1 | 84.3333 | 0.3 |
| 4 | 0.78 | 2.5 | 2.1 | 8.9 | 6.7 | 12.9 | 5.5 | 90.7 | 84.9 | 3 |
| 5 | 0.78 | 2.7 | 2.1 | 8.6 | 5.5 | 10.1 | 9 | 92 | 84.7 | 3 |
| 6 | 0.78 | 2.4 | 2.5 | 8.4 | 4.3 | 10.6 | 3.5 | 92.8 | 84.8 | 1 |
| 7 | 0.78 | 2.4 | 1.9 | 8.1 | 5.8 | 12.3 | 4.5 | 91.6 | 84.7 | 2 |
| AVE | | | 2.2 | 8.5 | 5.575 | 11.475 | 5.625 | 91.775 | 84.775 | 3 |
| 8 | 0.57 | 2.5 | 2.7 | 9.5 | 10.2 | 15.2 | 8.2 | 87.6 | 84.1 | 0 |
| 9 | 0.57 | 2.6 | 2.5 | 13 | 10.8 | 17.5 | 4.4 | 85.9 | 84.2 | 5 |
| 10 | 0.57 | 2.5 | 2.7 | 8.9 | 7.9 | 12.9 | 5.8 | 89.7 | 84.5 | 0 |
| 11 | 0.57 | 2.6 | 2.3 | 9.5 | 9.2 | 14.1 | 7 | 88.3 | 84.2 | 0 |
| 12 | 0.57 | 2.5 | 3.3 | 10.5 | 11.1 | 15.7 | 9.9 | 86.2 | 84.3 | 2 |
| AVE | | | 2.6 | 9.3 | 9.84 | 15.08 | 7.06 | 87.54 | 84.26 | 1.4 |
| Focused Heating | | | | | | | | | | |
| 13 | 1.03 | 2.3 | 1.8 | 12.3 | 2.3 | 9.8 | 5.1 | 93.4 | 83.9 | 0 |
| 14 | 1.03 | 2.4 | 1.7 | 14.9 | 1.8 | 8.9 | 6.9 | 93.3 | 83.9 | 0 |
| 15 | 1.03 | 2.2 | 1.7 | 11.3 | 2.3 | 10.8 | 5.9 | 93.9 | 83.7 | 1 |
| 16 | 1.03 | 2.4 | 1.5 | 12.2 | 1.7 | 9.3 | 3.7 | 94.3 | 83.8 | 1 |

TABLE 1-continued

| Sample | Target Rate #'s/min | Avg Dry Film Thickness | LW | SW | du | Wa | We | BOI | 20° Gloss | Craters (Total) |
|---|---|---|---|---|---|---|---|---|---|---|
| AVE | | | 1.6 | 12.8 | 2.025 | 9.7 | 5.4 | 93.725 | 83.825 | 0.5 |
| 17 | 0.78 | 2.4 | 2.5 | 14.2 | 1.2 | 9 | 9.6 | 93.9 | 84.5 | 0 |
| 18 | 0.78 | 2.7 | 1.3 | 13.5 | 1 | 7.8 | 2.1 | 94.9 | 84.5 | 0 |
| 19 | 0.78 | 2.6 | 1.5 | 14.3 | 1.2 | 7.4 | 6.9 | 94.3 | 84.5 | 0 |
| 20 | 0.78 | 2.6 | 2 | 14.4 | 1.7 | 8.6 | 5.5 | 93.4 | 84.7 | 0 |
| AVE | | | 1.6 | 14.1 | 1.275 | 8.2 | 6.025 | 94.125 | 84.55 | 0 |
| 21 | 0.57 | 2.6 | 1.9 | 13.9 | 1.7 | 8.8 | 7.3 | 93.9 | 84.6 | 0 |
| 22 | 0.57 | 2.3 | 1.9 | 11 | 1.8 | 10.8 | 6 | 93.9 | 84.6 | 0 |
| 23 | 0.57 | 2.3 | 2 | 11 | 1.6 | 10.4 | 5.9 | 94.5 | 84.3 | 0 |
| AVE | | | 1.9 | 12 | 1.7 | 10 | 6.4 | 94.1 | 84.5 | 0 |

As can be seen in Table 1, the coating prepared according to the present invention had better crater resistance as compared to the conventionally prepared powder.

As used herein, unless otherwise expressly specified, all numbers such as those expressing values, ranges, amounts or percentages may be read as if prefaced by the word "about", even if the term does not expressly appear. Any numerical range recited herein is intended to include all sub-ranges subsumed therein. Plural encompasses singular and vice versa.

It will be readily apparent to those of ordinary skill in the art that various changes may be made to the present invention without departing from the spirit and scope thereof. For example various temperature profiles in the heated portion and cooled portion could be utilized with the plurality of segments 24 in these portions. The described embodiment is intended to be illustrative of the present invention and not restrictive thereof. The scope of the present invention is intended to be defined by the appended claims and equivalents thereto.

What is claimed is:

1. A process for manufacturing powder coatings comprising:
   A) feeding starting materials to an extruder;
   B) shear mixing the starting materials at ambient temperature in a first portion of the extruder; and
   C) melt mixing the material from step B in a second portion of the extruder so as to achieve a melt mix, wherein the starting materials comprise a resin and a crosslinking agent.

2. The process of claim 1 further comprising:
   D) cooling the melt mix of step C in a third portion of the extruder.

3. The process of claim 1, wherein the first portion forms about 25% to about 40% of the length of the extruder.

4. The process of claim 1, wherein the second portion forms about 25% to about 40% of the length of the extruder.

5. The process of claim 2, wherein the third portion forms about 25% to 40% of the length of the extruder.

6. The process of claim 2, wherein the temperature of the melt mix is reduced by about 10° C. to 35° C. prior to exiting the extruder.

7. The process of claim 1, wherein the powder coating is a thermosetting powder coating.

8. The process of claim 1, wherein the material of step B is melt mixed at a temperature of about 70° C. to 150° C.

9. An extrusion process for manufacturing powder coating compositions from starting materials, wherein the extruder is divided into three portions, an initial ambient portion, an intermediate heated portion, and a final cooled portion, and wherein the starting materials comprise a resin and a crosslinking agent.

10. The extrusion process of claim 9, wherein the heated portion of the extruder forms about 35% to about 40% of the length of the extruder.

11. The extrusion process of claim 9, wherein the ambient portion of the extruder forms about 25% to about 32% of the length of the extruder.

12. The extrusion process of claim 9, wherein the heated portion of the extruder heats the starting materials to a temperature 40° C. to 140° C. higher than the temperature of the starting materials in the initial, ambient portion.

13. The process of claim 1, wherein the melt mix is subjected to focused heating.

14. The process of claim 13, wherein the focused heating comprises heating the shear mix to a temperature of 70° C. to 150° C. for 1 to 30 seconds.

* * * * *